G. C. JENSEN.
ROTATABLE LOCK AND INTERLOCK.
APPLICATION FILED AUG. 20, 1918.
1,400,679.
Patented Dec. 20, 1921.
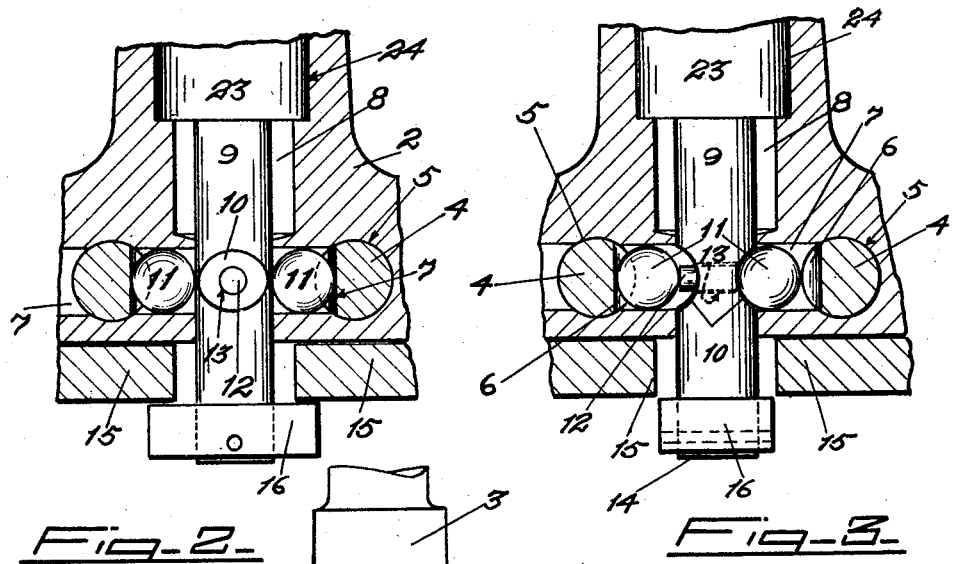
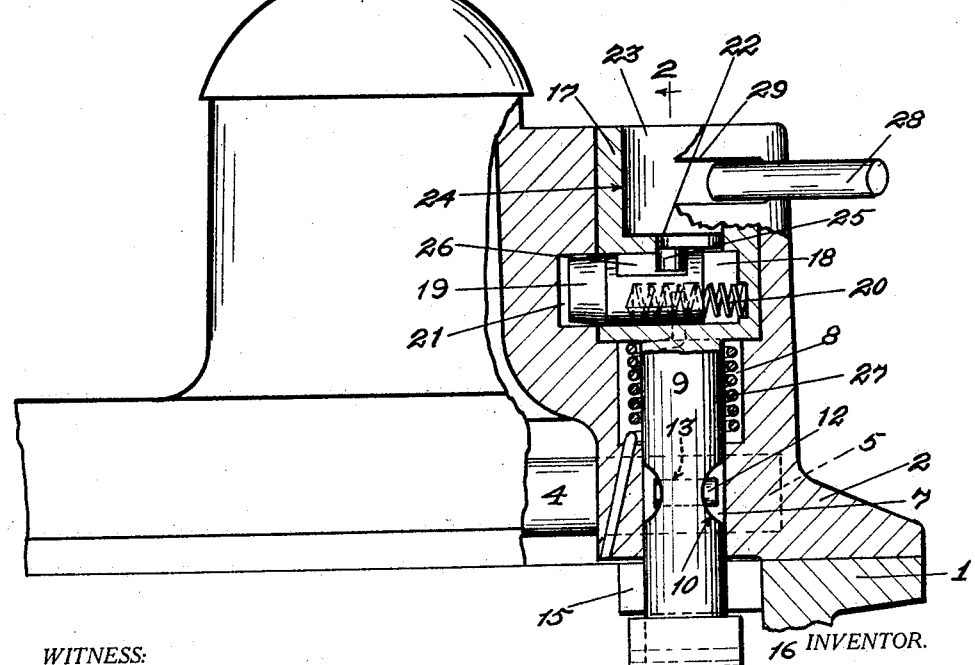

UNITED STATES PATENT OFFICE.

GEORGE C. JENSEN, OF OAKLAND, CALIFORNIA.

ROTATABLE LOCK AND INTERLOCK.

1,400,679.   Specification of Letters Patent.   Patented Dec. 20, 1921.

Application filed August 20, 1918. Serial No. 250,656.

*To all whom it may concern:*

Be it known that I, GEORGE C. JENSEN, a citizen of the United States, residing at Oakland, in the county of Alameda and State of California, have invented certain new and useful Improvements in Rotatable Locks and Interlocks, of which the following is a specification.

The present invention relates to a construction wherein an interlock is provided between the gear shift rods of an automobile, and wherein said rods are also capable of being locked from operative movement.

The invention consists primarily in a rotatable locking bolt extending between the gear shift rods and which is provided in its opposite faces with suitable recesses in which are adapted to be received suitable spherical members positioned between the bolt and the gear shift rods, the spherical members operating an interlocking pin, whereby on the movement of one of the rods the spherical member associated with the other is forced into engagement therewith, locking the same from movement; the rotation of the bolt to remove the recesses thereof from coöperation with the spherical members forcing the spherical members into engagement with the shift rods to simultaneously lock the same from operative movement.

With the above mentioned and other objects in view; the invention consists in the novel construction and combination of parts hereinafter described, illustrated in the accompanying drawings and pointed out in the claims hereto appended; it being understood that various changes in the form, proportion, size and minor details of construction within the scope of the claims may be resorted to without departing from the spirit or sacrificing any of the advantages of the invention.

To more fully comprehend the invention, reference is directed to the accompanying drawings, wherein—

Figure 1 is a view in vertical section of the preferred embodiment of my invention.

Fig. 2 is a sectional view taken on line 2—2 of Fig. 1.

Fig. 3 is a view similar to Fig. 2 with the bolt rotated at right angles to the position illustrated in Fig. 2.

Referring more particularly to the drawings, wherein like characters of reference designate corresponding parts—1 indicates a gear shift casing having a removable cover 2 which carries a suitable gear shift device operating lever 3 of any suitable construction. The operation of the lever is adapted to selectively move the parallel spaced longitudinally movable shifter rods or devices 4 carried within bores 5 within the cover 2, said rods being provided on their adjacent faces with stops or depressions 6 which are adapted to register with the opposite ends of the transverse bore 7 connecting the bores 5 when the rods 4 are moved to position the gears operated thereby in neutral position.

Vertically disposed within a bore 8 extending through the cover 2 and intersecting the bore 7 is a controlling bolt 9 capable of axial rotation. The bolt is provided in the region of said bore 7 and on opposite faces thereof with the semi-circular depressions 10 in which are adapted to be received a portion of the spherical members 11 positioned one at each side of the bolt 9 within the bore 7. Each of the spherical members 11 is adapted for coöperating with the stop of the respective rods 4, and said members are of a diameter corresponding to the distance between the surface of the bolt 9 and the base of the stops 6, whereby on the rotation of the bolt to a position, as in Fig. 2, the spherical members will be separated, one coöperating with each stop to simultaneously lock the rods from movement.

The bolt is provided in line with the recesses 10 with a longitudinally movable interlocking pin 12 freely movable in a bore 13 extending transversely through the bolt, the pin being of a length corresponding to the distance between the base of one of said recesses 10 and the surface of the bolt in which the opposing recess is formed, whereby on the positioning of the bolt, as in Fig. 3, the movement of one rod 4 will cause a dislodgment of the spherical member 11 from its recess 6, said member moving the pin 12 longitudinally, whereby the other spherical member is maintained seated in its coöperating stop, retaining the rod associated therewith in locked position until such time as the operated rod 4 has been returned to normal or neutral position.

The employment of the spherical members reduces friction in both the operation of the bolt 9 and in the movement of the rods 4. The lower end 14 of the bolt is adapted to extend between the spaced lugs 15 carried by the casing 1, and said bolt carries an elongated locking member 16 adapted when the bolt is rotated in a position as in Fig. 2 to project below said lugs, thereby precluding the removal of the cover from the case during such time as the rods are locked from operative movement.

The upper portion of the bolt is formed with an enlarged head 17 provided with a laterally disposed open ended bore 18 in which is slidably mounted a latch 19 normally pressed outwardly by a spring 20 within said bore, the outer end of the latch adapted for reception in a recess 21 to lock the bolt from movement on the rotation of the same to a position as in Fig. 2.

The latch is retracted by the rotation of a suitable key controlled barrel 22 positioned within a cylinder 23 inserted in a recess or cutout 24 in the upper end of the bolt, the barrel carrying an offset lug 25 projecting into a recess 26 in the upper face of the latch whereby on the rotation of the barrel the latch will be retracted.

On the retracting of the latch 19 a spring 27 coiled about the bolt 9 and secured at one end to the cover 2 and at its opposite end to the bolt, rotates the bolt from a position as in Fig. 2 to that in Fig. 3, permitting operative movement of the rods 4, and, if desirable, also permitting the removal of the cover from the case.

An operating handle 28 extending laterally from the upper end of the bolt and working in a groove 29 in that portion of the cover surrounding the bolt facilitates the movement of the bolt from unlocked to locked position and also limits the degree of axial rotation of the bolt.

By this construction I am enabled to employ a bolt of less diameter than the distance between the shift rods or devices, and by the employment of the spherical members am enabled on the axial rotation of the bolt to lock the shift rods or devices from operative movement, and am enabled on the rotation of the bolt to another position to provide an interlock between the rods or shifter devices, whereby on the movement of one rod the other is precluded from operative movement.

Having thus described my invention, what I claim as new and desire to protect by Letters Patent is:—

1. In combination with a pair of longitudinally movable parallel spaced shifter devices provided on adjacent faces with depressions adapted to normally lie opposite each other, a guide extending between said devices, a rotatable locking bolt extending into said guide and of a diameter less than the distance between said devices, said bolt provided on opposite faces in the region of said guide with a recess, a member interposed between the opposite sides of said bolt and said shifter devices and one receivable within the recess of the bolt during the movement of its associated shifter device from normal position, an interlocking member associated with said bolt and coöperating with said members, and adapted on the reception of one of said members within its coöperating recess to be moved longitudinally and to project the other member beyond the end of said guide and into the depression in its associated shifter device, thereby locking said shifter device from movement during the movement of the other shifter device from normal position, said bolt adapted on the rotation thereof to simultaneously force both of said members outwardly in said guide into their associated depressions in the shifter devices, thereby locking said shifter devices from operative movement, and means for locking the bolt in its latter position.

2. The combination of a change speed gear casing, sliding gear shifting rods in said casing having apertures at their adjacent sides opposite each other in neutral position, a walled cavity extending between said apertures in said position of the rods, a plurality of parts bearing and adapted to reciprocate in said passage, a rotatable bolt having its axis extending at right angles to said passage and its inner end extending into said passage, said bolt being shaped to act as a cam so that the turning of said bolt about its axis to one position shall cause said parts to engage in said apertures, said bolt provided with means adapted on the turning of the bolt to another position to maintain one of said parts in engagement with its coöperating aperture while the other part is permitted to be expelled from its coöperating aperture.

3. The combination of a change speed gear casing, sliding gear shifting rods in said casing having apertures at their adjacent sides opposite each other in neutral position, a walled cavity extending between said apertures in said position of the rods, a plurality of parts bearing and adapted to reciprocate in said passage, a rotatable bolt having its axis extending at right angles to said passage and its inner end extending into said passage, said bolt being shaped to act as a cam so that the turning of said bolt about its axis to one position shall cause said parts to engage in said apertures, said bolt provided with means adapted on the turning of the bolt to another position to maintain one of said parts in engagement with its coöperating aperture, while the other part is expelled from its coöperating aperture upon movement of the corresponding shifting rod, and locking mechanism operatively associated with said bolt.

4. In combination, a pair of sliding gear-shifting rods having apertures at their adjacent sides opposite each other in neutral position, and a transversely disposed rotatable bolt, locking means interposed between the bolt and rods adapted in one position of of the bolt to engage in the recesses of the rods to lock the same, and adapted in another position of the bolt to lock one only of said rods.

5. In combination with a pair of sliding shifting rods having apertures at their adjacent sides, opposite each other when in neutral position, a transversely rotatable bolt traversing a space between said rods, said bolt having opposed recessed portions to register in one position of the bolt with the apertures of the rods, said bolt having laterally disposed actuating means, and movable elements interposed between said actuating means and the rods, said elements being constructed and arranged whereby when the bolt is rotated to one position the apertured portions of the rods will be simultaneously engaged to lock the rods, and whereby as the bolt is moved to a different position one of said rods will be engaged to lock the same, whereas the other rod will be free to slide.

6. In combination, a pair of sliding gear-shifting rods, having apertures at their adjacent sides opposite each other in neutral position, and a transversely disposed movable bolt and locking means associated with the bolt and controlled thereby whereby the same is adapted in one position of the bolt to engage in the recesses of the rods to lock both of the same and adapted in another position of the bolt to lock one of said rods and permit movement of the other.

7. In combination with a pair of sliding shifting rods having apertures at their adjacent sides opposite each other when in neutral position, a transversely disposed movable bolt traversing a space between said rods, said bolt having opposed recessed portions to register in one position of the bolt with the apertures of the rods, a plurality of parts interposed between the bolt and the recessed portions of said rods, said bolt being provided with means adapted on the movement of the bolt to one position to cause said parts to engage in said apertures, and also provided with means adapted on the movement of the bolt to another position to maintain one of said parts in engagement with its coöperating aperture.

In testimony whereof I have signed my name to this specification in the presence of two subscribing witnesses.

GEORGE C. JENSEN.

Witnesses:
HARRY A. TOTTEN,
D. B. RICHARDS.